United States Patent Office 2,836,615
Patented May 27, 1958

2,836,615

METHYLENE BLUE REMOVAL FROM ACRYLIC MONOMERS

Samuel Allen Heininger and Edward L. Doerr, Dayton, Ohio, assignors to Monsanto Chemical Company, St. Louis, Mo., a corporation of Delaware No Drawing. Application March 21, 1956
Serial No. 572,800

7 Claims. (Cl. 260—465.9)

This invention relates to the removal of inhibitors from polymerizable unsaturated monomers, and more particularly to the removal of methylene blue from an acrylic monomer selected from the group consisting of acrylonitrile, acrylic acid, and alkyl esters of acrylic acid containing from one to eighteen carbon atoms in the alkyl radical.

To avoid the spontaneous polymerization of unsaturated monomers during storage and shipping in the interval between the preparation of the monomers and their conversion into polymers, it is customary to add to the unsaturated monomers compounds which act as polymerization inhibitors. These inhibitors must be removed from the monomers prior to polymerization, since otherwise they tend to slow down the polymerization rate or prevent complete polymerization, and the presence of the inhibitors may also lead to deleterious properties in the polymeric products, i. e., color formation, decreased stability and the like.

Methylene blue is known to be a useful polymerization inhibitor for acrylic monomers when added thereto in, e. g., an amount of about 0.1% by weight. When it is desired to polymerize the inhibited monomer, however, although it may be possible to overcome the polymerization-inhibiting effect of the inhibitor by use of sufficient polymerization catalyst, it is particularly desirable to remove this inhibitor prior to polymerization because of the vivid color which it imparts to the monomer and to the polymer produced therefrom. Methylene blue may be removed from acrylic monomers by distillation, but this requires an extra stage in the processing of the monomer, and thus introduces additional expenses in the process of producing the polymer. Furthermore, in distilling unsaturated monomers to remove methylene blue therefrom, the danger of spontaneous polymerization of the monomer at the distillation temperatures is always present; this is of particular importance in the removal of methylene blue inhibitor from higher alkyl esters of acrylic acid, which boil at relatively high temperatures. Accordingly, it is desirable to provide a method for the removal of methylene blue inhibitor from acrylic monomers wherein the monomer is separated from inhibitor without the employment of elevated temperatures conducive to undesired polymerization.

In accordance with this invention, an adsorbent material is employed for the removal of methylene blue from acrylic monomeric materials.

Available adsorbent agents include carbonaceous adsorbents, e. g., bone char and vegetable carbons; aluminosilicate clays, e. g., naturally adsorbent clays such as fuller's earth, and activable clays such as bentonite; aluminum oxides, including bauxite and alumina which has been activated, as by dehydration; silica gels; and diatomaceous earths, ion-exchange resins, and miscellaneous adsorbents such as titanium dioxide.

It is well known that, despite many studies carried out over a long period of time, the effectiveness of various classes of adsorbent agents is not predictable. The order in which materials are preferentially adsorbed by carbon, a non-polar adsorbent, is generally reversed on a polar adsorbent such as silica gel, but the method of preparation of the adsorbent agent greatly affects its properties, and a carbon may be activated, for example, to cause it to act as a polar adsorbent. The more polar of a mixture of materials is generally preferentially adsorbed on a polar adsorbent, but the order of adsorption of given materials on a given adsorbent is again not predictable without experimental confirmation. At the ends of concentration ranges, the component present in smaller amount may be said to be usually preferentially adsorbed, but this rule is not inevitably obeyed. (See, for example, "Adsorption," by C. L. Mantell, N. Y., McGraw-Hill, 1945; "Adsorption and Chromatograph," by H. G. Cassidy, N. Y., Interscience, 1951.) Thus the selection of an adsorbent for a particular function can only be predicated on experimental determination of the suitability of a particular agent for a particular purpose.

It has now been found that methylene blue may be readily and substantially completely removed from acrylic monomers by adsorption on actively adsorbent magnesium silicate clays.

The acrylic monomers from which methylene blue may be removed by adsorption in accordance with the present invention include acrylonitrile, acrylic acid, and alkyl esters of acrylic acid containing from one to eighteen carbon atoms in the alkyl radical. Included in the acrylic acid alkyl esters which may be freed of inhibitor in accordance with this invention are lower alkyl esters such as methyl acrylate, ethyl acrylate, and butyl acrylate, as well as higher alkyl esters such as 2-ethylhexyl acrylate, nonyl acrylate, decyl acrylate, tridecyl acrylate, hexadecyl acrylate, octadecyl acrylate, etc. The alkyl esters may be derived from single, straight- or branched-chain alcohols, or may be derived from mixtures of isomeric alcohols. Thus, for example, the present process is applicable to the removal of methylene blue from an acrylic ester produced by esterification of acrylic acid with a mixture of isomeric alcohols such as is obtained by the catalytic addition of carbon monoxide and hydrogen to an olefin such as tetrapropylene or triisobutylene in an Oxo process reaction, to form an aldehyde which is subsequently reduced to the corresponding alcohol containing one carbon more than the olefinic starting material.

It is important in carrying out the present reaction that the acrylic monomer be substantially free of water. Not only is the adsorbent wasted by contact with moisture-containing monomers, since the adsorption of water deactivates the presently useful adsorbents, but also we have found that a methylene blue-containing acrylic monomer which contains substantial amounts of moisture, after passage through one of the presently useful adsorbents, while the blue color has been removed, has a brown or tan tint. We do not know the cause of this color formation, but it may be due to reaction of the methylene blue with an ingredient of the adsorbent in the presence of water. In any case, the process of this invention is preferably carried out in the substantial absence of water.

In accordance with this invention, active adsorbent magnesium silicate clays are used for the adsorption of methylene blue from acrylic monomers. While we have found that percolation of a methylene blue-inhibited acrylic ester through an activated aluminum oxide adsorbent fails to remove the inhibitor therefrom, it has unexpectedly been found that any of several various adsorbent aluminosilicate clays and silicate clays containing magnesium do abstract the methylene blue dye from acrylic monomers, leaving the monomer in a colorless, readily polymerizable, form. The magnesium aluminosilicate active adsorbent clays are well known. Thus, for example, it is known that adsorbent aluminosilicate clays of the montmorillonite group include the naturally active bleaching clay, fuller's earth, as well as the activable bentonite clays, which are activated by treatment with acid. Discussions of the known magnesium aluminosilicate adsorbent clays are given, for example, in "Adsorption" by C. L. Mantell, N. Y., McGraw-Hill, 1945. A variety of fuller's earth is the mineral attapulgite, which is a fibrous magnesium silicate, free of aluminum, of the composition $Mg_{2.5}H[(H_2O)_3|Si_4O_{11}]H_2O$ (K. Rankama, and Th. G. Sahama, "Geochemistry": Univ. Chicago, 1950; pg. 204); attapulgite and similar magnesium silicate adsorbent clays are equally useful in the process of the invention.

In carrying out the present process, the methylene blue-containing anhydrous acrylic monomer is contacted with the adsorbent, either by slurrying the adsorbent with the acrylic monomer, or by percolating the monomer through a column packed with the adsorbent. The temperature at which the adsorption is carried out is most conveniently the ambient temperature of the area, though it is not precluded to operate at any decreased temperatures at which the monomer flows sufficiently readily for easy handling, or at increased temperatures, up to temperatures which are below those at which the monomer in question begins to polymerize. The temperature within a percolation adsorption column may be controlled by embedding cooling coils within the column. If desired, to facilitate the flow of the more viscous monomers through the column, a slight pressure may be applied by means of an inert gas such as nitrogen. When a percolation method is used in the present process, the monomer may be allowed to flow down through the column, or may be forced through the column of adsorbent from below.

The time of contact depends on the amounts of inhibitor present and adsorbent used, the particle size of the adsorbent, the pressure applied, etc. The period during which the monomer is in contact with the adsorbent may be controlled, for example, by adjustment of the length of the column and rate of through-put. In commercial operation, when a percolation method is used, a series of columns may be employed, the outflow from one column, if it is incompletely purified of inhibitor, being cycled through the next, until the effluent monomer is sufficiently free of inhibitor for satisfactory polymerization.

The invention is further illustrated but not limited by the following examples:

Example 1

This example illustrates the removal of methylene blue from acrylonitrile on an activated clay.

An adsorbent bed about 2 inches in diameter and approximately ¼ inch deep was prepared in a Buchner funnel by pouring into it granules of a clay known to the trade as Super Filtrol (Filtrol Corp., Los Angeles, Calif.) and reputed to be an activated bentonite clay. Acrylonitrile containing methylene blue dissolved and suspended therein was then poured through the bed of adsorbent. The effluent monomer was colorless and adapted for polymerization.

Example 2

This example illustrates the removal of methylene blue from acrylic acid by treatment with an activated clay.

Through a ¼ x 2 inch circular bed of Super Filtrol was poured an acrylic acid containing 2.6% water and inhibited by addition of methylene blue. The filtrate was completely colorless and readily polymerizable.

When a 50% aqueous solution of acrylic acid containing methylene blue was similarly filtered through a bed of the Super Filtrol activated bentonite, the filtrate was a clear, light orange brown in color. It is thus necessary for the acrylic monomer inhibited by methylene blue to be substantially anhydrous before the adsorption treatment in accordance with the present process, for complete decolorization and removal of inhibitor to be accomplished.

Example 3

This example illustrates the removal of methylene blue from an acrylic ester on an activated aluminosilicate clay.

A sample of tridecyl acrylate containing about 0.1% methylene blue as inhibitor was filtered through a ¼ x 2 inch bed of Super Filtrol. A blue layer was observed on the surface of the clay. The effluent was completely colorless and readily polymerizable.

Example 4

This example illustrates the removal of methylene blue from another higher alkyl ester of acrylic acid on a different silicate clay.

A ¼ to ⅛ inch thick bed was prepared in a 2 inch Buchner funnel by pouring thereinto a layer of an attapulgite clay. Tridecyl acrylate inhibited with approximately 0.1% methylene blue was then poured through the filter bed. The effluent was completely colorless and readily polymerizable.

Similarly, decyl acrylate containing polymerization-inhibiting amounts of methylene blue is converted to a colorless, readily polymerizable form by filtration through a shallow bed of a magnesium silicate adsorbent clay.

Example 5

This example illustrates the removal of methylene blue from a lower alkyl ester of acrylic acid.

A sample of ethyl acrylate inhibited with methylene blue was poured through a column of Super Filtrol as described above. The effluent was clear and colorless and readily polymerizable.

Various modifications and variations of this invention will be obvious to those skilled in the art and are to be regarded as within the purview of this application and the spirit and scope of the appended claims.

What is claimed is:

1. The method for the removal of methylene blue inhibitor from a substantially anhydrous acrylic monomer selected from the class consisting of acrylonitrile, acrylic acid, and alkyl esters of acrylic acid wherein the ester alkyl radical is derived from an alcohol containing from one to eighteen carbon atoms, which comprises contacting the said acrylic monomer, containing a polymerization-inhibiting amount of methylene blue, with an actively adsorbent magnesium silicate clay, and isolating therefrom the said acrylic monomer in a form having a decreased content of methylene blue, substantially colorless, and adapted for polymerization.

2. The process for the removal of methylene blue from acrylonitrile which comprises contacting substantially anhydrous acrylonitrile containing a polymerization-inhibiting amount of methylene blue with an actively adsorbent magnesium silicate clay, and isolating therefrom acrylonitrile in a form having a decreased content of methylene blue, substantially colorless, and adapted for polymerization.

3. The method for the removal of methylene blue from acrylic acid which comprises contacting substantially anhydrous acrylic acid containing a polymerization-inhibiting amount of methylene blue with an actively adsorbent magnesium silicate clay, and isolating therefrom acrylic acid in a form having a decreased content of methylene blue, substantially colorless, and adapted for polymerization.

4. The method for the removal of methylene blue from an alkyl ester of acrylic acid wherein the ester alkyl radical is derived from an alkyl alcohol containing from one to eighteen carbon atoms, which comprises contacting the said acrylic ester, in substantially anhydrous form and containing a polymerization-inhibiting amount of a methylene blue, with an actively adsorbent magnesium silicate clay, and isolating therefrom the said acrylic ester in a form having a decreased content of methylene blue, substantially colorless, and adapted for polymerization.

5. The method for the removal of methylene blue from tridecyl acrylate which comprises contacting substantially anhydrous tridecyl acrylate containing a polymerization-inhibiting amount of methylene blue with an actively adsorbent magnesium silicate clay, and isolating therefrom tridecyl acrylate in a form having a decreased content of methylene blue, substantially colorless, and adapted for polymerization.

6. The method for the removal of methylene blue from decyl acrylate which comprises contacting substantially anhydrous decyl acrylate containing a polymerization-inhibiting amount of methylene blue with an actively adsorbent magnesium silicate clay, and isolating therefrom decyl acrylate in a form having a decreased content of methylene blue, substantially colorless, and adapted for polymerization.

7. The method for the removal of methylene blue from ethyl acrylate which comprises contacting substantially anhydrous ethyl acrylate containing a polymerization-inhibiting amount of methylene blue with an actively adsorbent magnesium silicate clay, and isolating therefrom the ethyl acrylate in a form having a decreased content of methylene blue, substantially colorless, and adapted for polymerization.

References Cited in the file of this patent

UNITED STATES PATENTS

| | | |
|---|---|---|
| 2,704,770 | Anspon | Mar. 22, 1955 |
| 2,719,169 | DeCroes et al. | Sept. 27, 1955 |
| 2,726,258 | Stehman | Dec. 6, 1955 |

OTHER REFERENCES

Adsorption by Mantell, p. 564, N. Y., McGraw-Hill, 1952.